United States Patent

Gravett

[15] 3,653,709
[45] Apr. 4, 1972

[54] AIR DEFLECTOR

[72] Inventor: Darrell E. Gravett, 700 Penn, Carlisle, Iowa 50047

[22] Filed: Nov. 19, 1969

[21] Appl. No.: 878,144

[52] U.S. Cl. ..............................................296/1 S, 240/8.3
[51] Int. Cl. ..........................................................B62d 35/00
[58] Field of Search ...............................296/1 S, 91; 240/8.3

[56] References Cited

UNITED STATES PATENTS 3,276,811  10/1966  Schmidt...................................296/1 S
2,133,927  10/1938  Riel.........................................296/91

FOREIGN PATENTS OR APPLICATIONS 162,423  3/1958  Sweden...................................240/8.3

Primary Examiner—Benjamin Hersh
Assistant Examiner—Robert R. Song
Attorney—Henderson & Strom

[57] ABSTRACT

An air deflector for use with a vehicle having rear lights affixed to the rear end thereof is provided herein. The air deflector comprises an air scoop secured to the vehicle, a conduit leading from the air scoop to the rear of the vehicle and an arcuate shield secured to the outlet end of the conduit. A continuous passageway is provided through the air deflector and, when the vehicle is moving forwardly, the shield directs a continuous current of air across the exterior of the rear lights to prevent accumulation of foreign materials on the rear lights.

4 Claims, 7 Drawing Figures

PATENTED APR 4 1972

3,653,709

INVENTOR.
DARRELL E. GRAVETT
BY Henderson & Strom
ATTORNEYS 3,653,709

AIR DEFLECTOR

BACKGROUND OF THE INVENTION

This invention relates to air deflectors and, more specifically, to air deflectors for use with vehicles having rear lights affixed to the rear end thereof. These air deflectors are adapted to prevent accumulation of foreign materials on the rear lights.

With increased use of motor vehicles, the motor vehicle accident rate has skyrocketed. Each successive year brings reports of increased highway fatalities and injuries and increased dollar volume of property damage. A significant proportion of these motor vehicle accidents involve rear end collisions caused, at least in part, by an accumulation of foreign materials on the rear lights. The foreign materials accumulating on the rear lights include dust, mud, and/or snow.

The Highway Safety Research Institute at the University of Michigan has studied possible alterations to the rear lights of motor vehicles to increase vehicle operation safety. They examined the effectiveness of three lights — a red stop light, an amber signal light, and a green running light. Their conclusion was that tri-colored lights were not a significant improvement. They did agree that some change in tail light configuration was necessary. Deputy Iowa Public Safety Commissioner Robert Taha echos the above sentiments for changes in tail light, "They're going to change models, . . . they may just as well change them for safety's sake."

The invention disclosed herein utilizes a simple and inexpensive device to prevent accumulation of foreign materials on the rear lights of a vehicle. The rear lights are then, at all times, readily visible; concomitantly, the number of rear end collisions can be materially decreased.

SUMMARY OF THE INVENTION

This invention relates to a safety device adapted to prevent accumulation of foreign materials on the rear lights of a vehicle. The safety device is an air deflector comprising an air scoop secured to the vehicle and having a forwardly facing air inlet and an air outlet. Conduits are attached to the air outlets and extend rearwardly to proximate the rear end of the vehicle near the rear lights. A deflecting means is affixed to the conduit proximate the rear end of the vehicle and has an opening therethrough facing generally across the exterior of the rear lights. When the vehicle is in motion, a current of air is continuously directed across the exterior of the rear lights.

The air deflector of this invention is advantageously utilized to prevent accumulation of foreign materials on the rear lights of a vehicle.

Additionally, in one embodiment, the air velocity is increased through the conduit and the resulting current of air is utilized to clean the rear lights.

By extending the lower portion of the air scoop forwardly of the upper portion, precipitation can be forced through the conduit and utilized to cleanse the rear lights.

DESCRIPTION OF THE PREFERRED EMBODIMENTS

Figures 1, 2:
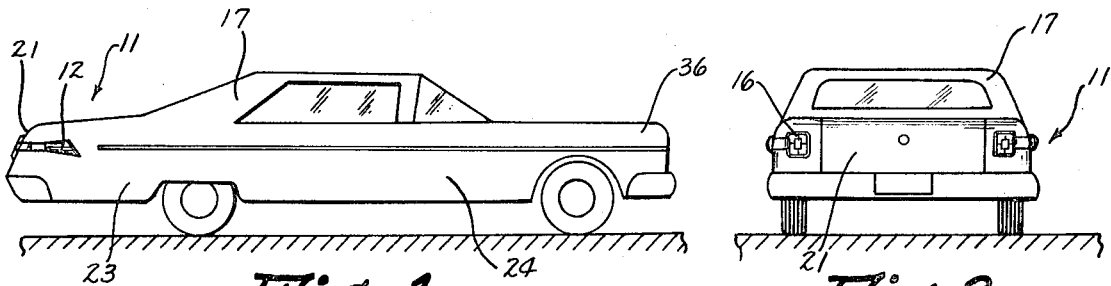
FIG. 1 is a side view of an automobile having the air deflector of this invention secured thereto.
FIG. 2 is a rear view of the automobile and air deflector of FIG. 1.

Referring now to the drawings, the air deflector of this invention is indicated generally at 11 in FIGS. 1–7. The air deflector 11 comprises an air scoop 12 having a forwardly facing air inlet 13. A conduit 14 is attached to the air scoop 12 and extends rearwardly to near the rear lights 16 of the vehicle 17. A deflecting means 18 is affixed to the conduit 14 and has an opening 19 formed therethrough which faces generally across the rear lights 16.

More specifically, the air deflectors 11 of this invention are adapted for use with vehicles 17 having rear lights affixed to the rear 21 of the vehicles 17. These air deflectors 11 are most effective with the recessed rear lights 16 shown in FIGS. 5 and 6 although they can be used to advantage with all rear lights 16. The air deflectors 11 are utilized to alleviate the partial vacuum formed proximate the rear lights 16 when the vehicle 17 is in motion. By alleviating this partial vacuum, accumulation of foreign materials on the rear lights 16 is reduced. As will be explained in detail hereinafter, positive pressure can also be introduced across and into the rear lights 16 by this air deflector 11 thereby cleaning those lights 16.

Although this invention is explained in relation to an automobile, it should be understood that the air deflector 11 can be used with any vehicle having rear lights.

As shown in FIGS. 1–7, the air deflector 11 comprises an air scoop 12 secured to the vehicle 17. The air scoop 12 has a forwardly facing air inlet 13 and an air outlet 22.

Figures 5, 6:
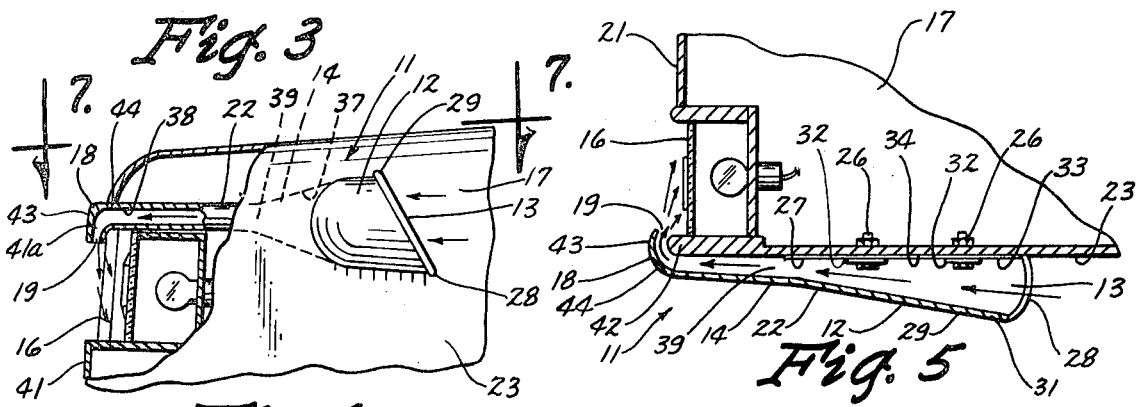
FIG. 5 is a cross-sectional view of the air deflector taken along line 5-5 of FIG. 4.
FIG. 6 is a second embodiment of this invention wherein the conduit means is disposed inside the rear quarter panel of the automobile.
Figure 7:
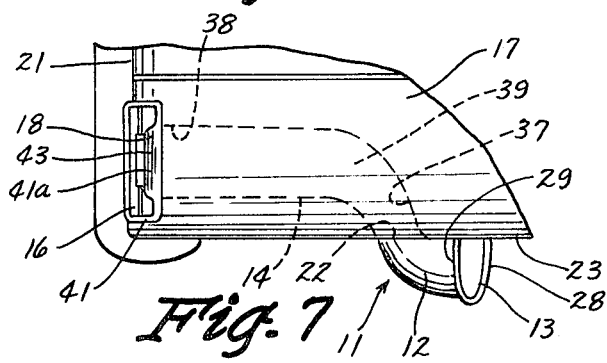
FIG. 7 is a top view of the air deflector of FIG. 6 taken along line 7—7 of FIG. 6.

The air scoop 12 is generally secured to the rearward portion 23 of the side 24 of the vehicle 17, commonly called the rear quarterpanel. The air scoop 12 can be built into the quarterpanel as shown in FIGS. 6 and 7 or it can be secured by bolts 26 (FIG. 5). If the air scoop 12 is secured by bolts 26, a gasket 27 is preferably provided to obtain a suitable seal with the quarterpanel.

In both of the embodiments shown of the air scoop 12, the lower portion 28 (FIGS. 4–7) preferably extends forwardly of the upper portion 29 of the air scoop 12. The lower portion 28, therefore, acts as a receptacle for precipitation and the air passing through the air scoop 12 forces the precipitation through the air deflector 11 to wash the rear lights 16. The forwardly extending lower portion 28 also reduces the amount of dust and other foreign materials passing through the air deflector 11.

The embodiment of the air scoop 12 shown in FIGS. 6 and 7 is built into the rear quarterpanel. The air outlet 22 is disposed in the interior of the vehicle 17, e.g., inside the rear quarterpanel. The air scoop 12 is positioned on the quarterpanel to allow precipitation to flow therethrough and wash the rear lights 16.

Figures 3, 4:
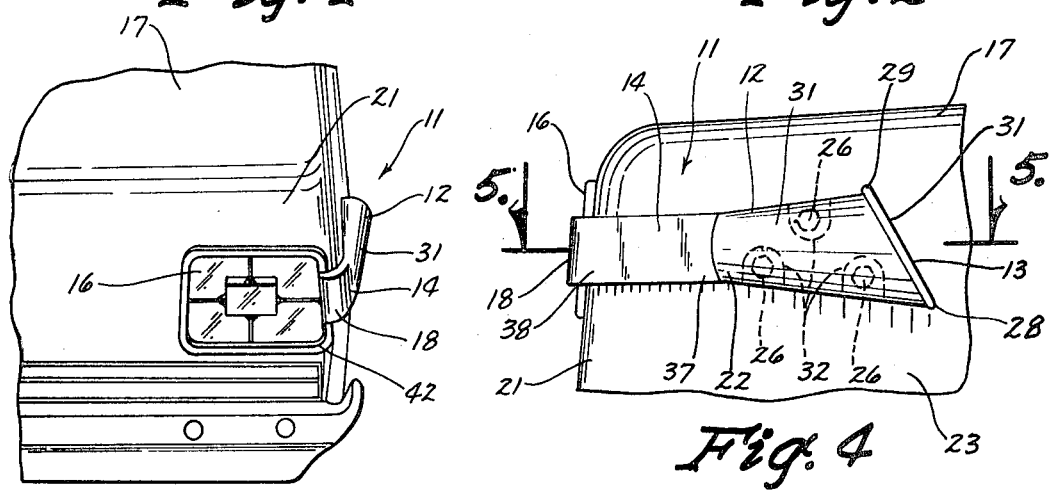
FIG. 3 is an enlarged fragmentary view of the automobile and air deflector of FIG. 2.
FIG. 4 is an enlarged fragmentary view of the automobile and air deflector of FIG. 1.

In the embodiment shown in FIGS. 3–5, the air scoop 12 comprises a C-shaped scoop 31 having lugs 32 extending into the open side 33. The lugs 32 are secured to the quaterpanel by bolts 26; the quarterpanel thereby forms one side 34 of the air scoop 12. The air outlet 22 of the air scoop 12 is disposed on the exterior of the vehicle 17, e.g., outside the rear quarterpanel. The air scoop 12 of this embodiment is also positioned on the quarterpanel to allow precipitation to flow therethrough and wash the rear lights 16.

The configuration of the air scoop 12 is not critical. The air scoop 12 must, however, capture enough air to alleviate the partial vacuum at the rear lights 17 and should capture enough air to introduce air under positive pressure at the rear lights 16. An arcuate configuration, when viewed from the forward end 36 of the vehicle 17 is preferred esthetically.

A conduit 14 (FIGS. 3–7) having an inlet end 37 and an outlet end 38 is attached at the inlet end 37 to the air outlet 22 of the air scoop 12. The conduit 14 extends rearwardly from the air scoop 12 to proximate the rear 21 of the vehicle 17 near a rear light 16. The conduit 14 has a passageway 39 formed therethrough and transmits the air from the air scoop 12 to the deflecting means 18. The configuration and the construction materials for the conduit 14 are not critical except as discussed hereinafter.

In the embodiment of FIGS. 6–7, the conduit 14 is disposed in the interior of the vehicle 17. The conduit 14 is secured to the air outlet 22 and extends rearwardly to the molding 41 of a rear light 16 where the deflecting means 18 is secured to the outlet end 38 thereof. Preferably, the conduit 14 exits through the molding 41a above the rear lights 16. Air then passes downwardly across the exterior of the rear lights 16 facilitating the cleansing of the rear lights 16.

In the embodiment shown in FIGS. 3–5, the conduit 14 is integrally formed with the C-shaped scoop 31. The conduit 14 extends rearwardly of the C-shaped scoop 31 on the exterior of the vehicle 17 to proximate a rear light 16. Generally, the outlet end 38 of the conduit 14 of this embodiment is disposed at the side 42 of a rear light 16.

In both of the above embodiments, it is preferred that the cross-sectional area of the conduit 14 decrease from the inlet end 37 to the outlet end 38. By decreasing the cross-sectional area, the velocity of the air passing through the conduit 14 is increased from the inlet end 37 to the outlet end 38 and a slight positive pressure is attained at high speeds. The increased velocity and positive pressure of the air help clean the rear lights 16.

Deflecting means 18 is affixed to the outlet end 38 of the conduit 14. The deflecting means 18 has an opening 19 formed therethrough which faces generally across the exterior of the rear lights 16.

As shown most clearly in FIGS. 5 and 6, the deflecting means 18 comprises a shield 43 secured to the outlet end 38 of the conduit 14. The shield 43 is secured to the portion 44 of the conduit 14 distal of the rear light 16. In FIG. 5 that distal portion 44 is the outermost side while in FIG. 6 it is the top.

The shield 43 is preferably of arcuate configuration to minimize turbulence in the air current flowing past the rear lights. The shield 43 should preferably direct the air inwardly as well as across the rear lights 16. This prevents formation of a partial vacuum in recessed rear lights 16 which could cause accumulation of foreign materials on the rear lights.

As shown in FIGS. 3–5, the shield 43 can be integrally formed with the air scoop 12 and the conduit 14 and disposed on the outside 42 of the rear light 16. Air is directed around the side 24 of the vehicle 17 to the rear lights 16. The shield 43 can also be formed as an integral part of the molding 41 as shown in FIGS. 6 and 7 and disposed above the rear light 16.

The air deflector 11 of this invention directs a current of air across and into the rear light 16 when the vehicle 17 is in motion. Both embodiments of this invention function in exactly the same manner. The embodiment of FIGS. 3–5 is suitable for demountable attachment to the vehicle 17 while the embodiment of FIGS. 6 and 7 is preferably built into the vehicle 17 at the time of manufacture.

Although preferred embodiments of this invention have been described, it is to be remembered that various modifications may be made without departing from the invention as defined in the appended claims.

I claim:

1. An air deflector adapted for use with a vehicle having at least one rear light affixed to the rear end of the vehicle, said air deflector comprising:
   an air scoop secured to the rearward portion of a side of the vehicle, said air scoop having an air inlet and an air outlet, said air inlet facing forwardly, and said air outlet of said air scoop being disposed in the interior of the vehicle;
   a conduit disposed in the interior of the vehicle and having an inlet end and an outlet end and having a passageway formed therethrough and being attached, at said inlet end, to said air outlet of said air scoop, said conduit extending rearwardly from said air scoop to proximate the rear end of the vehicle near a rear light;
   deflecting means affixed to said conduit at said outlet end; said deflecting means having an opening formed therethrough facing generally across the exterior of the rear light, said deflecting means comprising a shield secured to said outlet end of said conduit and secured to the portion of said conduit distal of the rear light;
   whereby when said vehicle is in motion a current of air is directed across the exterior of the rear light thereby preventing accumulation of foreign materials on the rear lights.

2. The air deflector of claim 1 wherein the cross-sectional area of said conduit decreases from said inlet end to said outlet end.

3. The air deflector of claim 2 wherein the lower portion of said air scoop extends forwardly of the upper portion of said air scoop.

4. The air deflector of claim 3 wherein said shield is disposed above said rear light.

* * * * *